United States Patent
Taneja et al.

(10) Patent No.: US 11,832,324 B2
(45) Date of Patent: Nov. 28, 2023

(54) DEVICE TO DEVICE COMMUNICATIONS IN HYBRID NETWORKS

(71) Applicant: Cisco Technology, Inc., San Jose, CA (US)

(72) Inventors: Mukesh Taneja, Bangalore (IN); Indermeet S. Gandhi, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 17/301,562

(22) Filed: Apr. 7, 2021

(65) Prior Publication Data

US 2022/0330363 A1    Oct. 13, 2022

(51) Int. Cl.
*H04W 76/15* (2018.01)
*H04W 36/00* (2009.01)
*H04W 72/04* (2023.01)

(52) U.S. Cl.
CPC ....... *H04W 76/15* (2018.02); *H04W 36/0022* (2013.01); *H04W 72/04* (2013.01)

(58) Field of Classification Search
CPC . H04W 76/15; H04W 36/0022; H04W 72/04; H04W 4/70
See application file for complete search history.

(56) References Cited

U.S. PATENT DOCUMENTS

| | | | |
|---|---|---|---|
| 11,082,857 B2 * | 8/2021 | Belleschi | H04W 72/044 |
| 2013/0102313 A1 | 4/2013 | Tinnakornsrisuphap et al. | |
| 2014/0092885 A1 | 4/2014 | Venkatachalam et al. | |
| 2016/0050698 A1 * | 2/2016 | Siomina | H04W 72/20 370/329 |
| 2016/0073316 A1 | 3/2016 | Calcev | |

(Continued)

FOREIGN PATENT DOCUMENTS

GB    2537623    * 10/2016    ......... H04L 67/1063

OTHER PUBLICATIONS

PCT, Notification of Transmittal of The International Search Report and The Written Opinion of The International Searching Authority, or The Declaration for Application PCT/US2022/071533 dated Jul. 8, 2022.

*Primary Examiner* — Shukri Taha
(74) *Attorney, Agent, or Firm* — Patterson + Sheridan, LLP

(57) ABSTRACT

Device-to-Device (D2D) communications in hybrid networks are provided by identifying a first dual-mode endpoint seeking to communicate with a second dual-mode endpoint via a D2D communications session; identifying a first communications pattern of network resource usage for the first Radio Access Technology (RAT) and a second communications pattern of network resource usage for the second RAT in the heterogeneous wireless network environment; assigning the D2D communications session to the first RAT based on the first communication pattern and the second communication pattern; and in response to detecting network resource usage changes in the first RAT, transitioning the D2D communications session to the second RAT. In some embodiments, the D2D communications session is assigned to the first RAT using a shared frequency regulated by a band access controller that is reserved as a static resource for D2D communication while high-priority signals are absent from the shared frequency.

13 Claims, 11 Drawing Sheets

(56) References Cited

U.S. PATENT DOCUMENTS

| | | |
|---|---|---|
| 2016/0088631 A1 | 3/2016 | Hedayat et al. |
| 2017/0142742 A1 | 5/2017 | Fischer et al. |
| 2018/0063691 A1 | 3/2018 | Shuman |
| 2019/0199725 A1 | 6/2019 | Pularikkal et al. |
| 2021/0084536 A1 | 3/2021 | Chou et al. |
| 2022/0131637 A1* | 4/2022 | Sangal .................. H04W 36/22 |

* cited by examiner

DEVICE TO DEVICE COMMUNICATIONS IN HYBRID NETWORKS

TECHNICAL FIELD

Embodiments presented in this disclosure generally relate to managing Device-to-Device (D2D) communications between two or more endpoints in a hybrid network that uses more than one Radio Access Technology (RAT). More specifically, embodiments disclosed herein provide for a network manager to determine which RATs are available for D2D communications for specific endpoints and how to bridge D2D communication sessions based on overall network conditions.

BACKGROUND

In a wireless network, various devices share access to the transmission medium, and access is controlled via various multiplexing schemes to avoid interference between devices. For example, two devices may communicate at different frequencies, at different times, at different locations (e.g., out of range of one another), or combinations thereof to avoid interfering with one another. An Access Point (AP) generally controls how the endpoint devices associated with that AP are allowed access to the transmission medium, as all communications to or from a given endpoint are routed through the associated AP as a first hop in a commutations chain. Accordingly, the associated AP assigns channels and times of use for the endpoint devices in range of (and associated with) the AP. However, D2D communications can bypass the APs in a network once a D2D channel is assigned, as endpoint devices are permitted to communication directly with one another so that no traffic passes through an AP

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
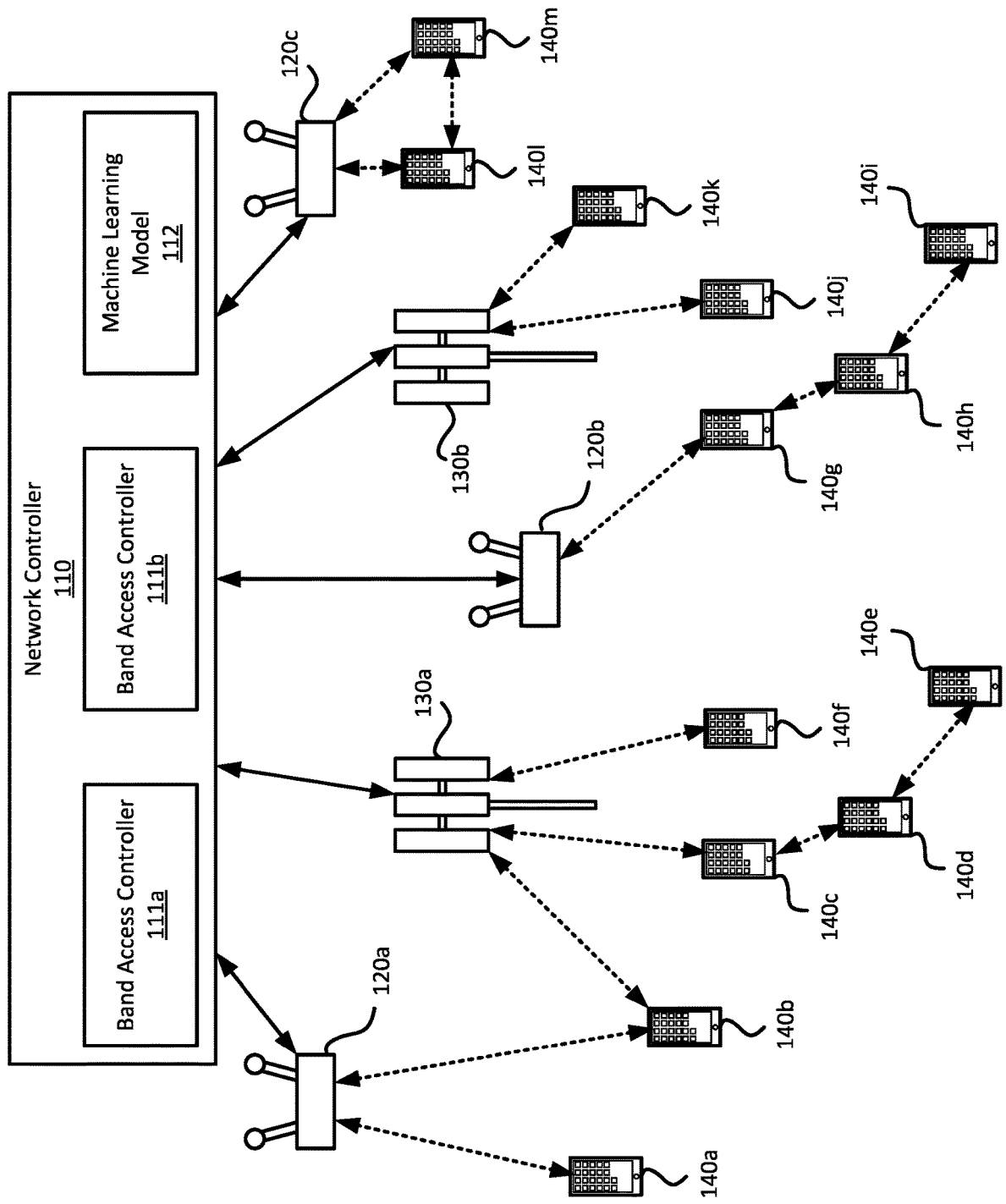
FIG. 1 illustrates a hybrid or heterogeneous network environment, according to embodiments of the present disclosure.

One embodiment presented in this disclosure is a system for managing a heterogeneous wireless network environment that offers communications via a first Radio Access Technology (RAT) and a second, different RAT, the system comprising: a processor; and a memory including instructions that when executed by the processor enable performance of operations comprising: identifying a first dual-mode endpoint seeking to communicate with a second dual-mode endpoint via a device-to-device (D2D) communications session; identifying a first communications pattern of network resource usage for the first RAT and a second communications pattern of network resource usage for the second RAT in the heterogeneous wireless network environment; assigning the D2D communications session to the first RAT based on the first communication pattern and the second communication pattern; and in response to detecting network resource usage changes in the first RAT, transitioning the D2D communications session to the second RAT.

One embodiment presented in this disclosure is a system for managing a heterogeneous wireless network environment that offers communications via a first Radio Access Technology (RAT) and a second, different RAT, the system comprising: a processor; and a memory including instructions that when executed by the processor enable performance of operations comprising: receiving a request to initiate a device-to-device (D2D) communications session between a first dual-mode endpoint and a second dual-mode endpoint, wherein the request identifies a first location of the first dual-mode endpoint and a second location of the second dual-mode endpoint; in response to determining that static resources for D2D communication are in the wireless network environment are insufficient to handle the D2D communications session, calculating proposed resources needed for establishing the D2D communication session; requesting dynamic permission from a band access controller based on the proposed resources; and in response to receiving approval of permission from the band access controller, assigning dynamic network resources for the D2D communications session from available resources instead of the static network resources.

One embodiment presented in this disclosure is a system for managing a heterogeneous wireless network environment that offers communications via a first Radio Access Technology (RAT) and a second RAT, the system comprising: a processor; and a memory including instructions that when executed by the processor enable performance of operations comprising: identifying a device-to-device (D2D) communications session between a first dual-mode endpoint and a second dual-mode endpoint using a first set of network resources; identifying communications patterns of network resource usage for the first RAT and the second RAT in the heterogeneous wireless network environment; and in response to detecting changes in the communications patterns, substituting a second set of network resources for the first set of network resources.

EXAMPLE EMBODIMENTS

The present disclosure provides for the management of D2D communications sessions in a heterogeneous wireless network environment in which the various user equipment have access to multiple wireless communications standards. In various embodiments, a controller for the network (in conjunction with a relevant band access controller) grants, denies, or withdraws permission for a D2D communications session to use a shared frequency band that is nominally reserved for higher-priority signaling devices that are currently not using the shared frequency band. The controller for the network reserves certain network resources as "static" for use in D2D communications session, and grants access to these static sets of network resources when the proposed requirements D2D communications session can be satisfied by the static resources, but can also assign "dynamic" network resources from the available resources in the networking environment to meet the needs of the proposed D2D communications session.

Once a D2D communications session is established, the network controller continues to monitor and analyze which sub-channels/Physical Resource Blocks are used (or requested for use) by the devices in the network and the various power levels thereof in the various coverage areas of the network to ensure that the various devices in the network use the available spectrum efficiently. When a D2D communications session is identified as using network resources inefficiently, that are requested (or required) by a higher-priority signaler, or are otherwise insufficient for maintaining the D2D communications session, the network controller calculates whether the set of network resources can be adjusted to maintain the D2D communication session. In various embodiments, the network controller can add, remove, or replace devices in the D2D communications session chain, switch the signaling standard used in one or more links between the devices in the D2D communications session, adjust the powers/sub-channels/Physical Resource Blocks used in one or more links between the devices in the D2D communications session, and combinations thereof to adjust and maintain the D2D communications session.

FIG. 1 illustrates a hybrid or heterogeneous wireless network environment 100, according to embodiments of the present disclosure. A network controller 110 communicates with several Access Points (APs) that offer and manage wireless communications sessions according to different Radio Access Technologies (RATs). As shown, three Wireless Local Area Network (WLAN) APs 120a-c (generally or collectively, WLAN APs 120) and two cellular APs 130a-b (generally or collectively, cellular APs 130) offer communications to several endpoints 140a-m (generally or collectively, endpoints 140) within range of the APs via different respective RATs. Although a given number of WLAN APs 120, cellular APs 130, and endpoints 140 are shown in the network environment 100 in a given arranging, it will be appreciated that more or fewer WLAN APs 120, cellular APs 130, and endpoints 140 in various other arrangements can be present in other embodiments of a network environment 100.

In the present disclosure, the network environment 100 is referred to as being a hybrid or heterogeneous deployment because at least two RATs are offered by the various APs (e.g., one by the WLAN APs 120 and one by the cellular APs 130). A WLAN AP 120 may include various networking devices configured to provide a "Wi-Fi" network according to the various families, sub-standards, and derivatives of the IEEE 802.11 standard. A cellular AP 130 may include various networking devices configured to provide a cellular network (or a sub-cell thereof) including the various generations an subtypes thereof, such as, Long Term Evolution (LTE) and Fifth Generation New Radio (5G NR)) networks, Citizens Broadband Radio Service (CBRS) networks, or the like. Additionally or alternatively, further AP types that offer wireless network according to proprietary standards can be used in conjunction with or instead of the WLAN APs 120 or the cellular APs 130 to provide two or more different RATs in the network environment 100. Example hardware as may be included in a WLAN AP 120 or cellular AP 130 is discussed in greater detail in regard to FIG. 6.

An endpoint 140 may include any computing device that is configured to wirelessly connect to one or more WLAN APs 120 or cellular APs 130. When an endpoint 140 is capable of connecting to both a WLAN AP 120 and a cellular AP 130 (either both at the same time or one at a time, sequentially), the endpoint 140 may be referred to as being dual-mode capable, dual-mode enabled, or generally as a dual-mode endpoint 140. Example endpoints 140 can include, but are not limited to: smart phones, feature phones, tablet computers, laptop computers, desktop computers, Internet of Things (IoT) devices, and the like. Various standards may refer to an endpoint 140 as a client device, user equipment (UE), mobile station (STA), or the like. Example hardware as may be included in an endpoint 140 is discussed in greater detail in regard to FIG. 6.

To access the wireless network(s) offered by the APs, the endpoints 140 are associated with one or more APs. For example, a first endpoint 140a is associated with a first WLAN AP 120a, whereas a thirteenth endpoint 140m is associated with a third WLAN AP 120c, to each receive network communications via the associated WLAN AP 120a or 120c according to a first RAT type. Similarly, a sixth endpoint 140f is associated with a first cellular AP 130a, whereas a tenth endpoint 140j is associated with a second cellular AP 130b, to each receive network communications via the associated cellular AP 130a or 130b according to a second RAT type. Each of the APs may be associated with various numbers of endpoints 140 based on the relative locations and signaling strengths of the APs and endpoints 140, service provision guarantees, and signaling conditions in the physical environment (including passive and active interference sources, rogue devices or competing networks, and previous network topologies). In various situations, individual endpoints 140 may request (or commanded by an AP or network controller 110) a handoff to be associated with a different AP (and disassociated with the currently associated-with AP).

Additionally, various dual-mode endpoints 140 can be associated simultaneously with two APs of different RAT types. For example, the second endpoint 140b is associated with the first WLAN AP 120a and the first cellular AP 130a, such as when the user is receiving a phone call via the first cellular AP 130a and simultaneously browsing the Internet via a Wi-Fi connection provided by the first WLAN AP 120a.

In addition to communications sessions handled through the APs, various endpoints 140 may engage in D2D communications sessions. When engaged in a D2D communications session, the communications sent between two (or more) endpoints 140 do not need to traverse the APs, unlike a standard communications session. For example, in a standard communications session between the twelfth endpoint 140l and the thirteenth endpoint 140m, a communication is sent from the twelfth endpoint 140l to the third WLAN AP 120c, which forwards the communication to the thirteenth endpoint 140m. In contrast, during a D2D communications session, a communication sent from the twelfth endpoint 140l to the thirteenth endpoint 140m is sent directly from the twelfth endpoint 140l to the thirteenth endpoint 140m.

A D2D communications session can include more than two endpoints 140, with various endpoints 140 acting as intermediary links. For example, the third endpoint 140*c*, fourth endpoint 140*d*, and fifth endpoint 140*e* may be engaged in a D2D communications session using the second RAT type so that data are passed between the participating endpoints 140*c-e* without the data traversing the first cellular AP 130*a*. Similarly, the seventh endpoint 140*g*, eighth endpoint 140*h*, and ninth endpoint 140*i* may be engaged in a D2D communications session using the first RAT type so that data are passed between the endpoints 140*g-i* without the data traversing the second WLAN AP 120*b*.

The APs, although connected wirelessly to the various associated endpoints 140, may be in communication with one another wirelessly (e.g., as a bridge connection or as part of a mesh network) or via a wired connection, and may be in communication with various networks not shown in FIG. 1, such as the Internet or a telephone system.

The network controller 110 is in communication with each of the APs (the collective WLAN APs 120 and cellular APs 130), to help the APs manage the network environment 100 for the various endpoints 140 therein. In various embodiments, the network controller 110 can be in communication with the various APs through wireless links, wired links, or combinations thereof. The network controller 110 allows for holistic management of the wireless transmission medium so that the various APs can effectively manage which devices are allocated specific channels at specific times (e.g., using spatial divisions in addition to time and frequency division to avoid interference between devices), prepare for handover of an endpoint 140 from one AP to another, and manage D2D communications sessions in the network environment 100, among other functionalities. In various embodiments, the network controller 110 can initially set and later adjust the membership in a D2D communication session, the RAT type used for the D2D communication sessions, and combinations thereof.

The network controller 110 can be provided on one or more computing devices as a cloud service, a dedicated server, or as a module in one AP (e.g., a "lead" or "central" AP) for managing the network environment 100. Example hardware as may be included in the network controller 110 is discussed in greater detail in regard to FIG. 6. In various embodiments, the network controller 110 includes or is in communication with one or more band access controllers 111*a-b* (generally or collectively band access controller 111) to determine whether the network environment has access to various shared bands that are at least sometimes shared with legacy signaling devices with higher priority access to those bands. For example, a first band access controller 111*a* may be a Spectrum Access System (SAS) used to control access to wireless networking resources in the 3.5 GHz (Gigahertz) band for CBRS (Citizens Broadband Radio Service) or 4G/5G cellular networks, while a second band access controller 111*b* may be an Automatic Function Coordinator (AFC) used to control access to wireless networking resources in the 6 GHz band for WLAN and 5G networks. The band access controllers 111 are used across RAT types to identify which channels in shared spectrum bands are currently available and may be shared across networks to avoid inter-network interference. For bands or channels that are not shared with legacy signaling devices, the network controller 110 does not need to consult a band access controller 111, and such a device or service may be omitted for those bands.

In some embodiments, the network controller 110 includes a machine learning model 112 to make various decisions related to D2D communication management (e.g., whether to allow a session, which RAT type to use for a session, whether to adjust a session, how to adjust a session, etc.) based on historically observed D2D sessions and networking resource usage statistics. Resource usage statistics can be reported by the band access controllers 111 to indicate the effect of a D2D communication session on overall network performance in the shared bands, by the APs to indicate the effect of a D2D communication session on localized network performance (e.g., within the service range of the AP), and by the participating endpoints 140 to indicate a Quality of Service (QoS) level or user experience rating for whether the D2D session was effective in communicating between the participating endpoints 140. Using the usage statistics, the machine learning model 112 can use various algorithms or techniques (e.g., support vector modeling, support vector regression) to identify how to manage D2D communication sessions to improve one or more of: network bandwidth availability, QoS for the endpoints 140 engaged in the D2D session for the D2D session, QoS for the endpoints 140 not engaged in the D2D session, transmission throughput, or the like.

Figure 2:
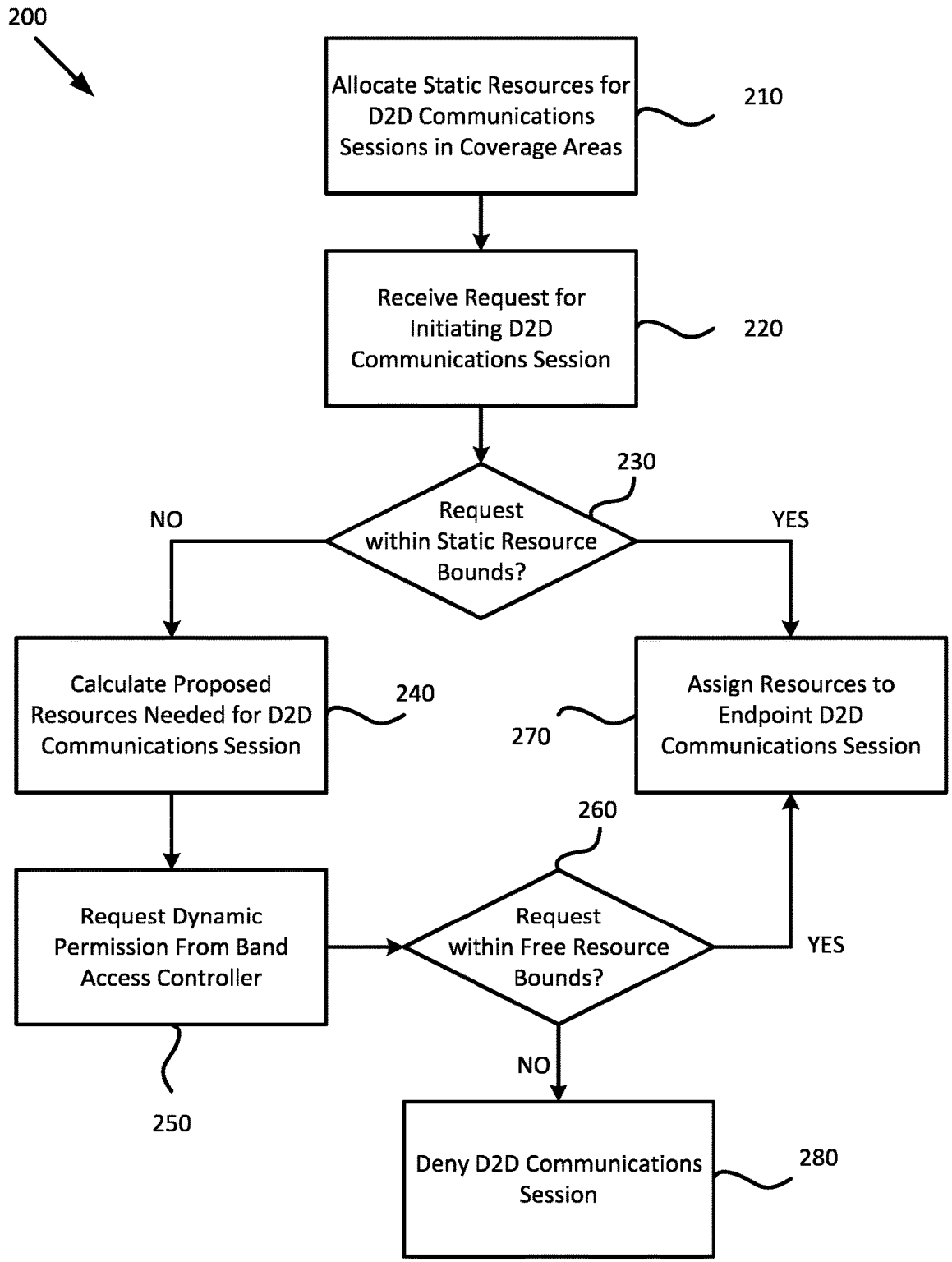
FIG. 2 is a flowchart of a method for determining whether to permit a new D2D communications session in a network environment, according to embodiments of the present disclosure.

FIG. 2 is a flowchart of a method 200 for determining whether to permit a new D2D communications session in a network environment 100, according to embodiments of the present disclosure.

Method 200 begins at block 210, where the network controller 110 allocates static resources for D2D communications sessions in various coverage areas of the network environment 100. The static resources include various sub-channels or Physical Resource Blocks (PRBs) used for carrying signals and the (maximum) Effective Isotropic Radiative Power (EIRP) allowed on those sub-channels/PRBs. The network controller 110 can allocate different resources in different coverage areas of the various APs to avoid generating interference from the D2D communications sessions or imparting interference on the D2D communications sessions. For example, the network controller 110 can divide the coverage area of a given AP into three zones, so that the given AP assigns a different set of sub-channels or PRBs reserved for D2D communication sessions in each zone.

When using shared spectrum bands (e.g. the 3.5 GHz and 6 GHz bands), the network controller 110 can contact the band access controllers 111 for the given spectrum band to identify which resources can be reserved as "static" resources for a given time period. Allocations of shared spectrum for use in D2D communications may be time sensitive to force the endpoints 140 to relinquish those network resources to higher-priority signaling devices before the next expected use of those resources occurs.

Depending on the network topology and operator preferences, the static resources may be evenly assigned across the network, or unevenly assigned based on RAT type, physical locations of the APs, and the historic use or request rates for D2D communication sessions across the network. In some embodiments, the network controller 110 suggests to the band access controller 111 how to divide the coverage area, and how many partitions to divide the coverage area into based on historically observed D2D communication patterns and non-D2D communication patterns. For example, if the network controller 110 identifies that WLAN APs 120 are frequently used at a higher capacity than cellular APs 130 in the network environment 100, the network controller 110 can recommend that a greater portion of the static resources reserved for D2D communications use a cellular RAT. In another example, the network controller 110 can recommend that an AP at the physical edge of the network environment 100 be assigned a greater number of sub-channels and with a higher EIRP than an AP located more centrally in the network environment 100.

In some embodiments, one or more coverage areas may be assigned no static resources, and the network controller 110 may actively decide to assign one or more APs a null set of static resources or may omit or postpone assigning static resources to passively not assign one or more APs an identified set of static resources. For example, when a weather radar is predicted (or detected) by a band access controller 111 to use a given channel, the band access controller 111 may actively deny the use of a given band for at least a period of time. In another example, when a network controller 110 identifies higher than normal traffic levels, the network controller 110 may forgo assigning static resources, instead preferring those resources to be available for non-D2D communications or making those resources conditionally available for D2D communications based on dynamic request-based assignments.

The static resources assigned are nominally reserved for D2D communications sessions for a given iteration of method 200, but may be accessed for other communications needs (and thereby temporarily blocked from use for D2D communications session) in various situations, such as when a higher-priority communication standard demands or requests access to those resources (e.g., as part of an emergency broadcast). Additionally, in subsequent iterations of method 200, the band access controller 111 reevaluates which resources are allocated as static resources. Stated differently, a given sub-channel/PRB and EIRP range that is set as a static resource during a first iteration of method 200 does not necessarily affect which sub-channels/PRBs and EIRP ranges are set as static resources during a second iteration of method 200.

At block 220, an AP receives a request for initiating a D2D communications session from an endpoint 140. The request identifies the requesting endpoint 140 and the target endpoint 140 for the prospective D2D communications session, and where those endpoints 140 are physically located in the network environment 100 (e.g., via coordinates determined via Global Positioning System (GPS), signal triangulation in at least one of the RATs, etc.). The AP then forwards the request to the network controller 110. The endpoints 140 request D2D communications using the procedures set forth in the associated RAT type of the AP (e.g., Wi-Fi hotspot or mesh networking procedures for WLAN APs 120 and LTE or 5G procedures with a cellular AP 130). In various embodiments, the requested D2D session may be for the same or a different RAT type than the receiving AP offers. For example, a WLAN AP 120 can receive and process using Wi-Fi networking procedures a request for a cellular-based D2D communications session.

At block 230, the network controller 110 evaluates the request to determine whether the static resources are sufficient to handle the requested D2D communications session. For example, if the communications session would require the signals to exceed the maximum EIRP for the endpoints 140 to receive signals (e.g., to achieve a given Signal to Noise Ratio (SNR) for a baseline QoS level), the network controller 110 (via the associated band access controller 111) denies access to the static resources for the proposed D2D communication session. In contrast, if the proposed communications session can be initiated using the static resources, the network controller 110 (via the associated band access controller 111) allows access to the static resources. The network controller 110 communicates the decision to the AP to forward to the relevant endpoints 140. When the D2D communications session is allowed, method 200 proceeds to block 270 to initiate the D2D communications session using the static resources. When the D2D communications session is denied, method 200 proceeds to block 240 to determine whether the D2D communications session may proceed using dynamic resources.

At block 240, the network controller 110 estimates the resources needed for establishing a D2D communications session between the requesting endpoint 140 and the target endpoint 140. The network controller 110 considers the network topology (including the locations of endpoints 140 and APs within range of the prospective signals needed for D2D communications) and what sub-channels/PRBs are currently available or otherwise not in use or reserved for use for non-D2D communications.

At block 250, the network controller 110 requests dynamic permission from the relevant band access controller 111 to initiate the D2D communications session based on the proposed resources estimated for the D2D communications session (per block 240). For example, when the network controller 110 requests dynamic access to the 3.5 GHz band, the network controller 110 contacts a first band access controller 111a of an SAS, but when the network controller 110 requests dynamic access to the 6 GHz band, the network controller 110 contacts a second band access controller 111b of an AFC. In various embodiments, the network controller 110 for a multi-RAT network environment 100 may query two or more band access controllers 111 at the same time, and if access is granted by both, the network controller 110 determines which band to use for the D2D communications session. The dynamic permission request identifies proposed resources to use from the free (i.e., not reserved) network resources for establishing a D2D communications session (e.g., one or more sub-channels/PRBs, EIRP ranges) and the locations of the participating endpoints 140.

At block 260, the band access controller 111 determines whether to allow or deny the request, based on whether the free resources in the current state of the network environment are sufficient for handling the proposed D2D communications session based. When the request would exceed the available free resources, the band access controller 111 denies the request, and method 200 proceeds to block 280. When the free resources are sufficient for the request, method 200 proceeds to block 270.

At block 270, the network controller 110 assigns the proposed resources for a D2D communications session for the requesting endpoint 140. The network controller 110 signals the AP associated with the requesting endpoint 140 that permission has been granted for D2D communications, which the AP forwards to the requesting endpoint 140. Once the D2D communications session is initiated, the endpoints 140 may engage in D2D communications until the endpoints 140 terminate the session or the network controller 110 adjusts or terminates the session due to changes in the availability of network resources. Method 200 may then conclude.

At block 280, the network controller 110 signals the AP associated with the requesting endpoint 140 that permission has been denied for D2D communications, which the AP forwards to the requesting endpoint 140. Method 200 may then conclude.

Figure 3:
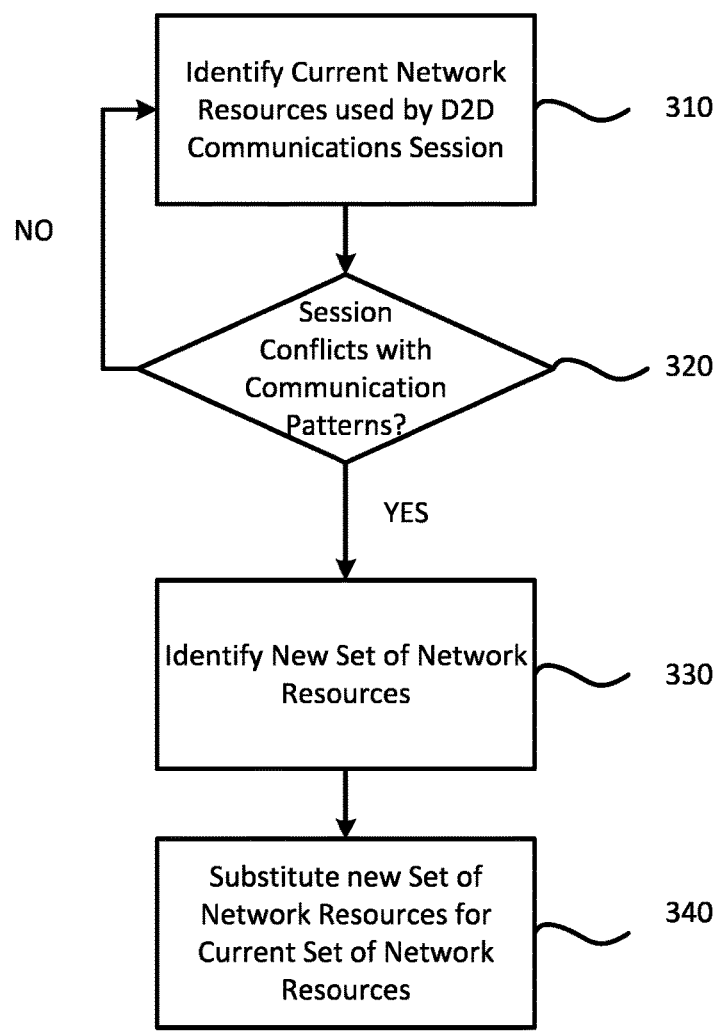
FIG. 3 is a flowchart of a method for managing D2D communication sessions, according to embodiments of the present disclosure.

FIG. 3 is a flowchart of a method 300 for managing D2D communication sessions, according to embodiments of the present disclosure. The method 300 assumes that a D2D communication has already been established, whether by method 200 or by some other technique. Method 300 begins at block 310, where the network controller 110 identifies a D2D communications session between a first endpoint 140a and a second endpoint 140b and the current set of network resources used by that D2D communications session. The current set of network resources include the sub-channel or PRBs used by the communicating devices, the number of links in the D2D communications session, the identity and location of first and second endpoints 140 (and any intermediate devices between the first and second endpoints 140), and the permitted EIRP ranges for the various links. In various embodiments, the network controller 110 requests (or is automatically updated with) the current set of network resources of the various devices engaged in D2D communications sessions via a schedule (e.g., every x seconds). Additionally or alternatively to scheduled updates, the network controller 110 can receive updates in response to changes in network conditions, such as an updated location reported from an AP when a device moves in the environment.

At block 320, the network controller 110 determines whether the D2D communications session (identified per block 310) conflicts with the current communications patterns of the network environment 100. Although discussed herein primarily with evaluating one D2D communications session, in various embodiments, the network controller 110 identifies and evaluates several D2D communications sessions in parallel.

A conflict arises when the network controller 110 determines that the D2D communications session is using resources that are no longer optimal for the session or the network environment 100 as a whole, and thus the D2D communications session should be adjusted to use an updated set of resource or terminated to free up the resources for another use. In various embodiments, a conflict between a D2D communications session and the current communication patterns can arise due to changes in the non-D2D communications patterns (e.g., interference patterns, higher-priority devices claiming access to the spectrum), changes in the network resources used by a D2D communications session (e.g., devices moving, increased signal power from the devices, communications taking longer than expected), or combinations thereof. In some examples, a conflict arises when the D2D communications session exceeds the initially set resources for the session (e.g., requiring higher signal strength), when one or more endpoints 140 have moved outside of a zone in which the initial resources were assigned, or another communications session (whether AP-to-endpoint, D2D, or from a legacy device claiming priority to the band) is set to use When the network controller 110 determines that the D2D communications session does not conflict with the current communications patterns of the network environment 100, method 300 may return to block 310 to evaluate additional D2D communications sessions or the presently evaluated D2D communications sessions at a subsequent time. When the network controller determines that the D2D communications session does conflict with the current communications patterns of the network environment 100, method 300 proceeds to block 330.

At block 330, in response to detecting a conflict with the communications patterns, the network controller 110 identifies a new set of network resources to substitute for the first set of resources. In various embodiments, the network controller 110 identifies free or otherwise available network resources that are not currently in use by another D2D communications session for reassignment for use as the new set of network resources for the D2D communications session found in conflict in block 320.

At block 340, the network controller 110 substitutes the identified second set of network resources for the first set of network resources for the D2D communications session identified in block 320 as being in conflict. In various embodiments, the network controller 110 transmits the new set of resources to one or more APs that are associated with the endpoints 140 participating in the affected D2D communications session. FIGS. 4A-4D and 5A-5C illustrate several examples of the effect of substituting a first (initial or current) set of network resources for a second (new) set of network resources, which can affect the membership of the D2D communications session and RAT changes in the D2D communications session as may be affected in different embodiments of method 300.

FIGS. 4A-4D illustrate several potential membership changes in a D2D communications session, according to embodiments of the present disclosure. In each of FIGS. 4A-4D, an initial set of network resources 410a of a D2D communications session includes a first endpoint 140a communicating to a second endpoint 140b via a third endpoint 140c, and the devices involved in the D2D communications session are updated in a subsequent set of network resources 410b to include different devices. The communications between any two devices illustrated in FIGS. 4A-4D may be performed via any of the available RATs in the network environment.

The initial set of network resources 410a includes the various sub-channels or PRBs used for carrying signals and the EIRPs allowed on those sub-channels/PRBs for the various links 420 (individually, 420a, 420b, etc.) between devices participating the D2D communications session. In various embodiments, the RAT used for one or more links 420 may be changed when updating the set of network resources (as is discussed in greater detail in regard to FIGS. 5A-5C), and the specific sub-channels/PRBs, EIRPs, and combinations thereof for a given link 420 can be updated, remain the same, or swap between sets of links 420.

Figure 4A:
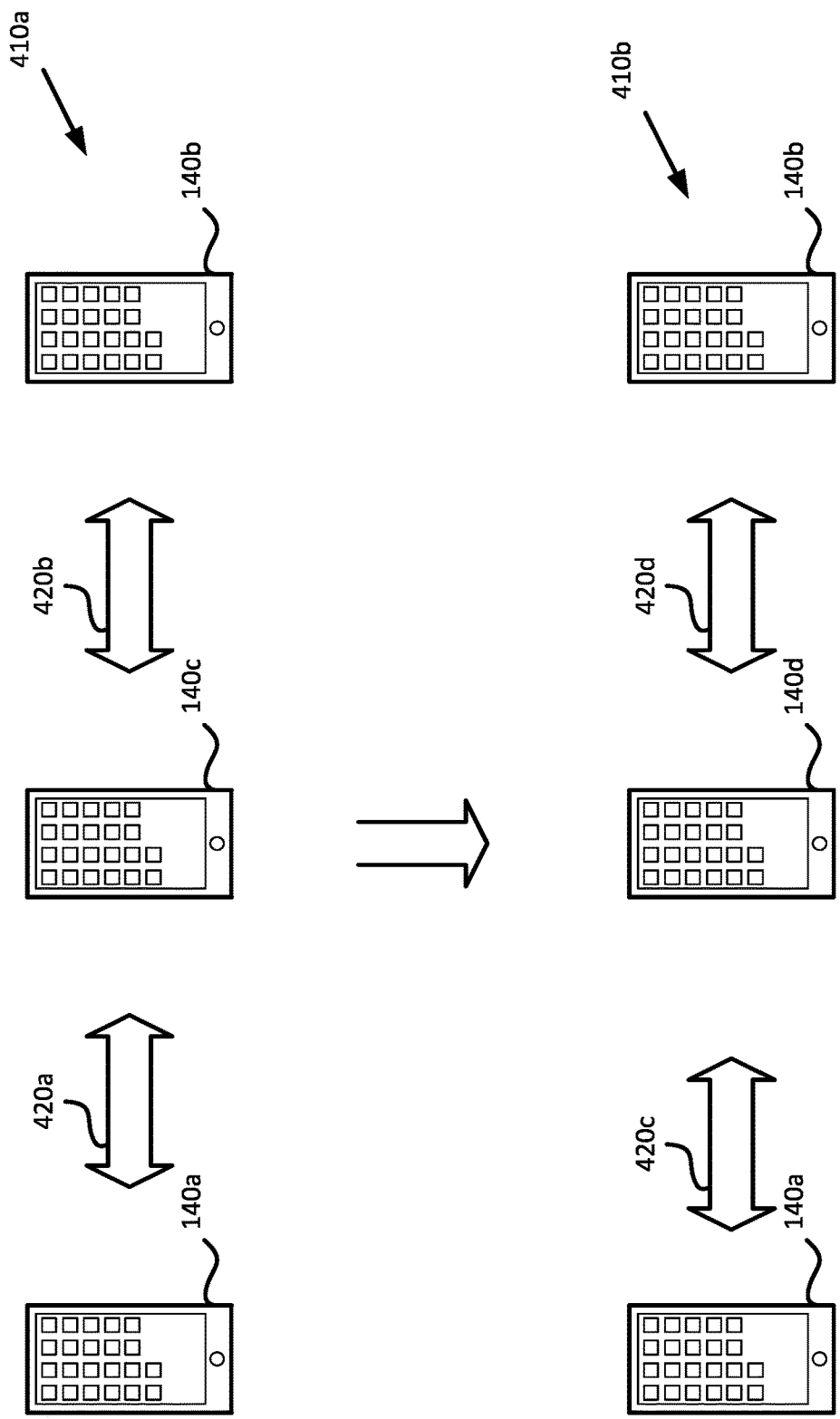
FIGS. 4A-4D illustrate several potential membership changes in a D2D communications session, according to embodiments of the present disclosure.
Figure 4B:
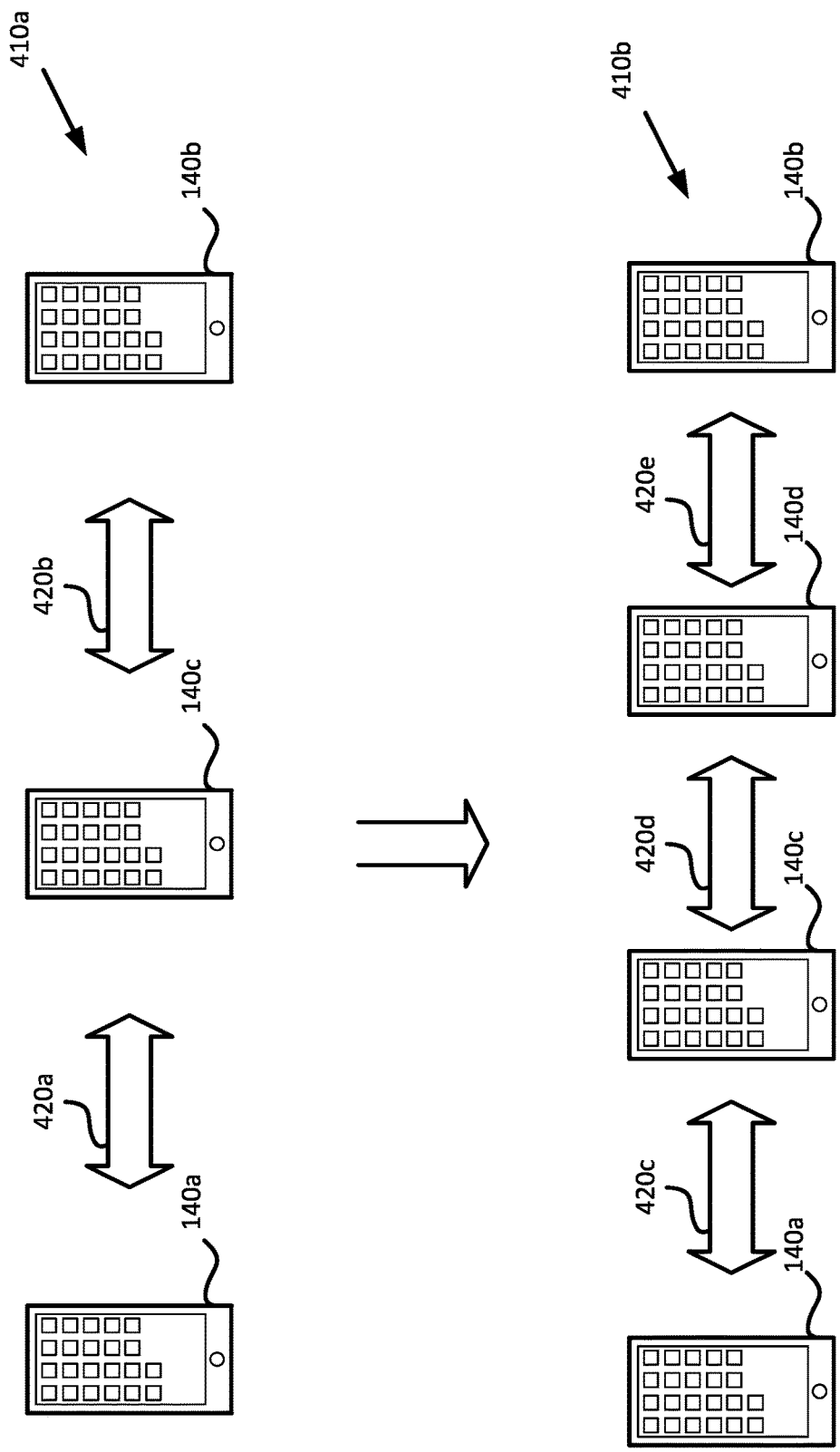
Figure 4C:
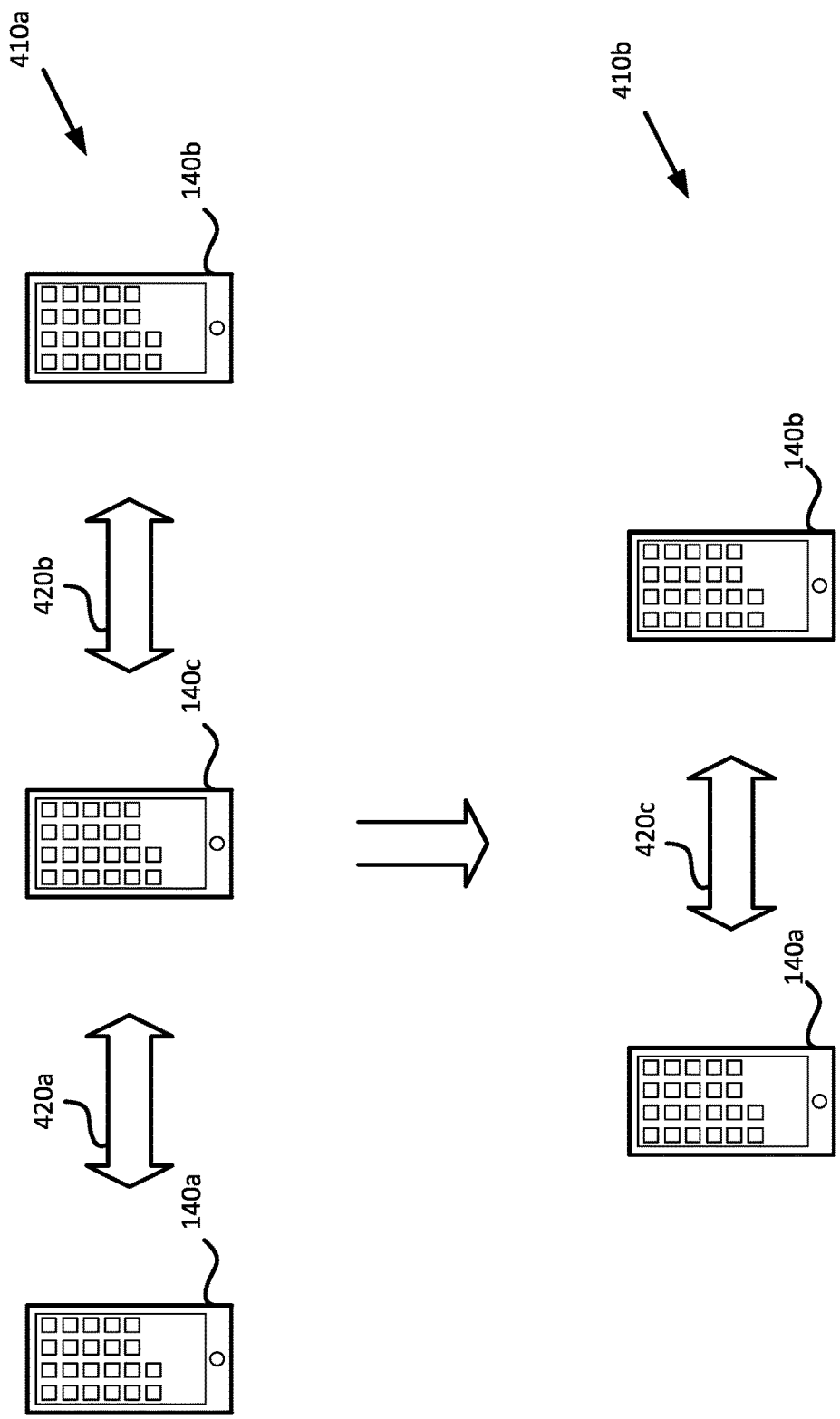
Figure 4D:
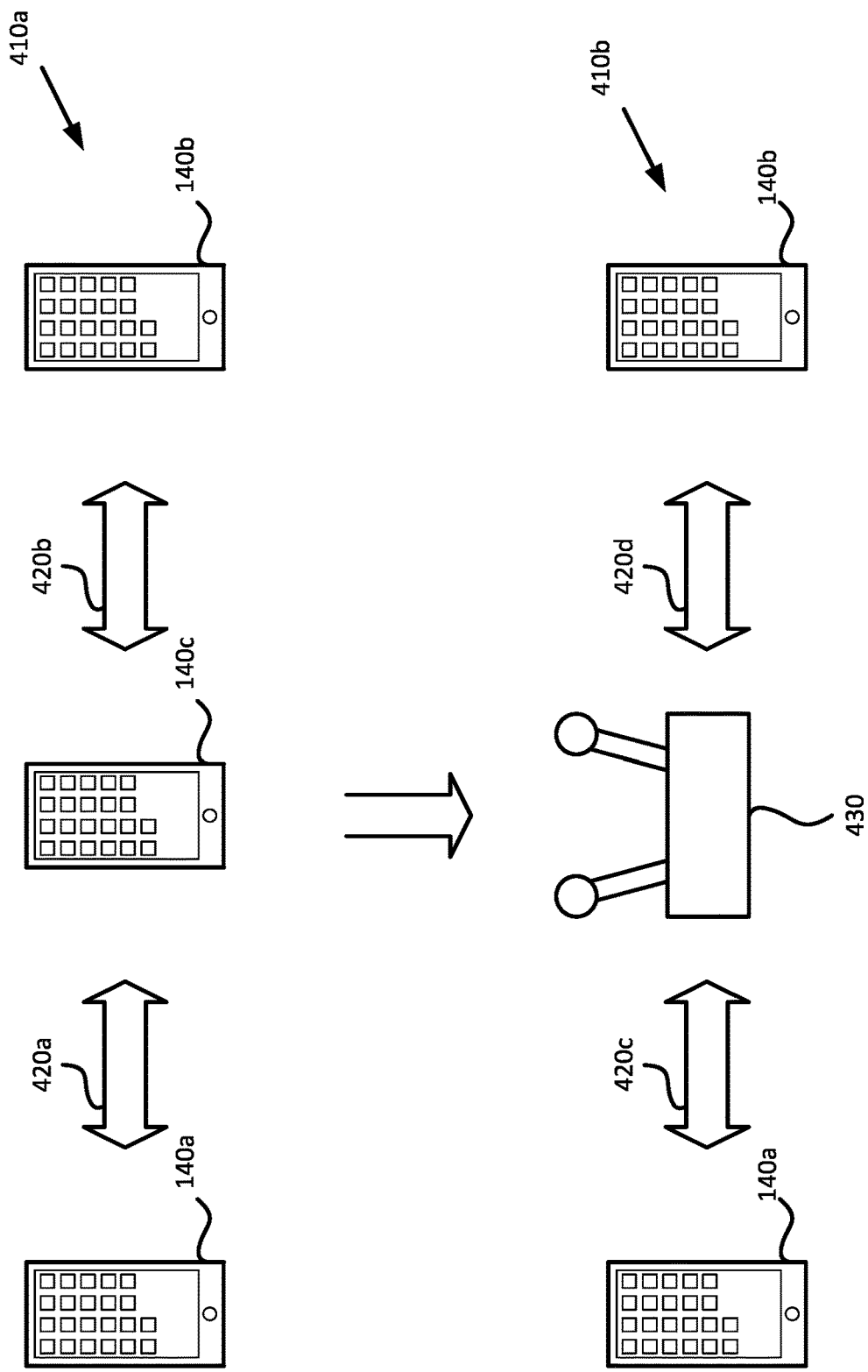
Figure 5A:
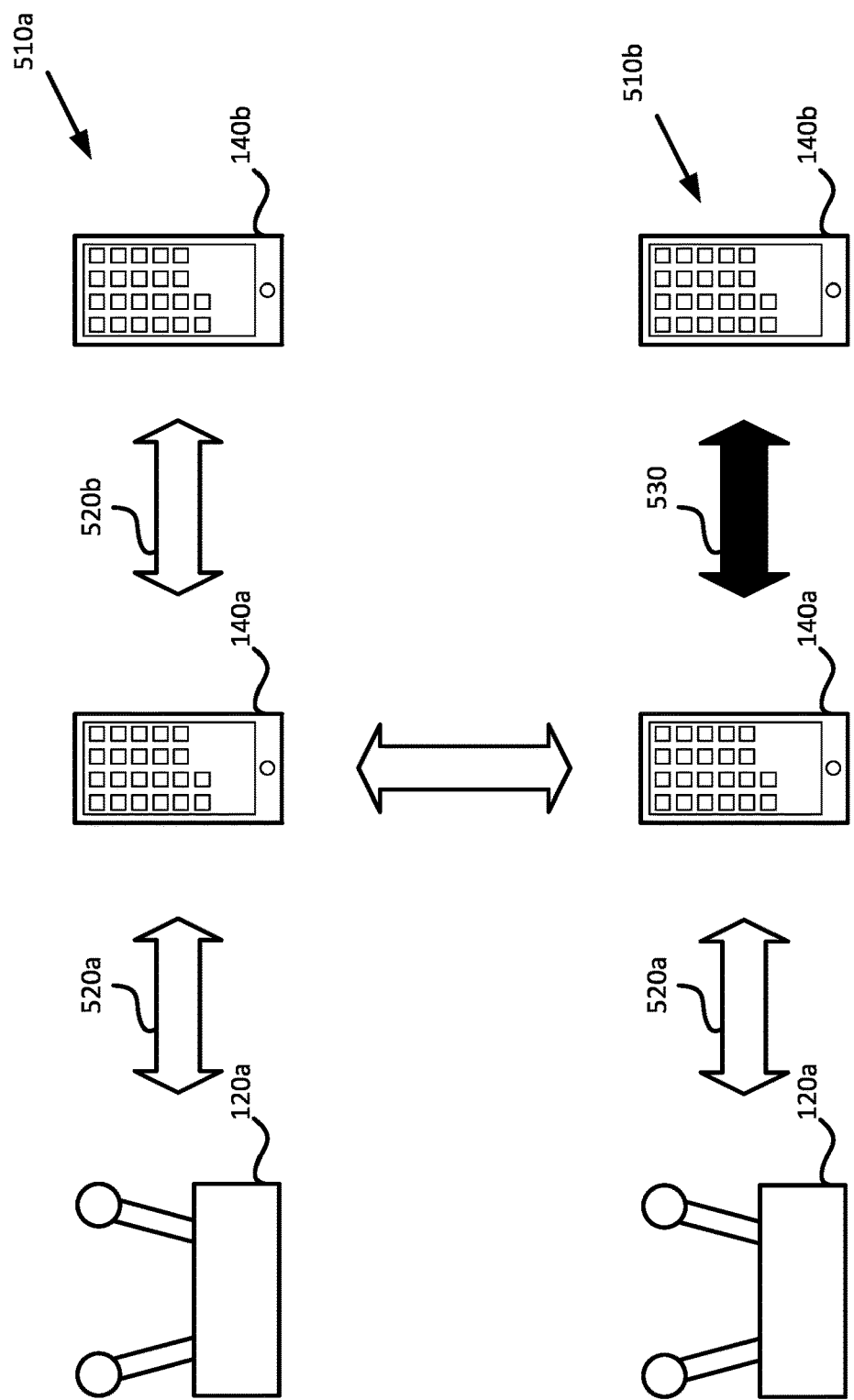
FIGS. 5A-5C illustrate potential RAT changes in a D2D communication session, according to embodiments of the present disclosure.
Figure 5B:
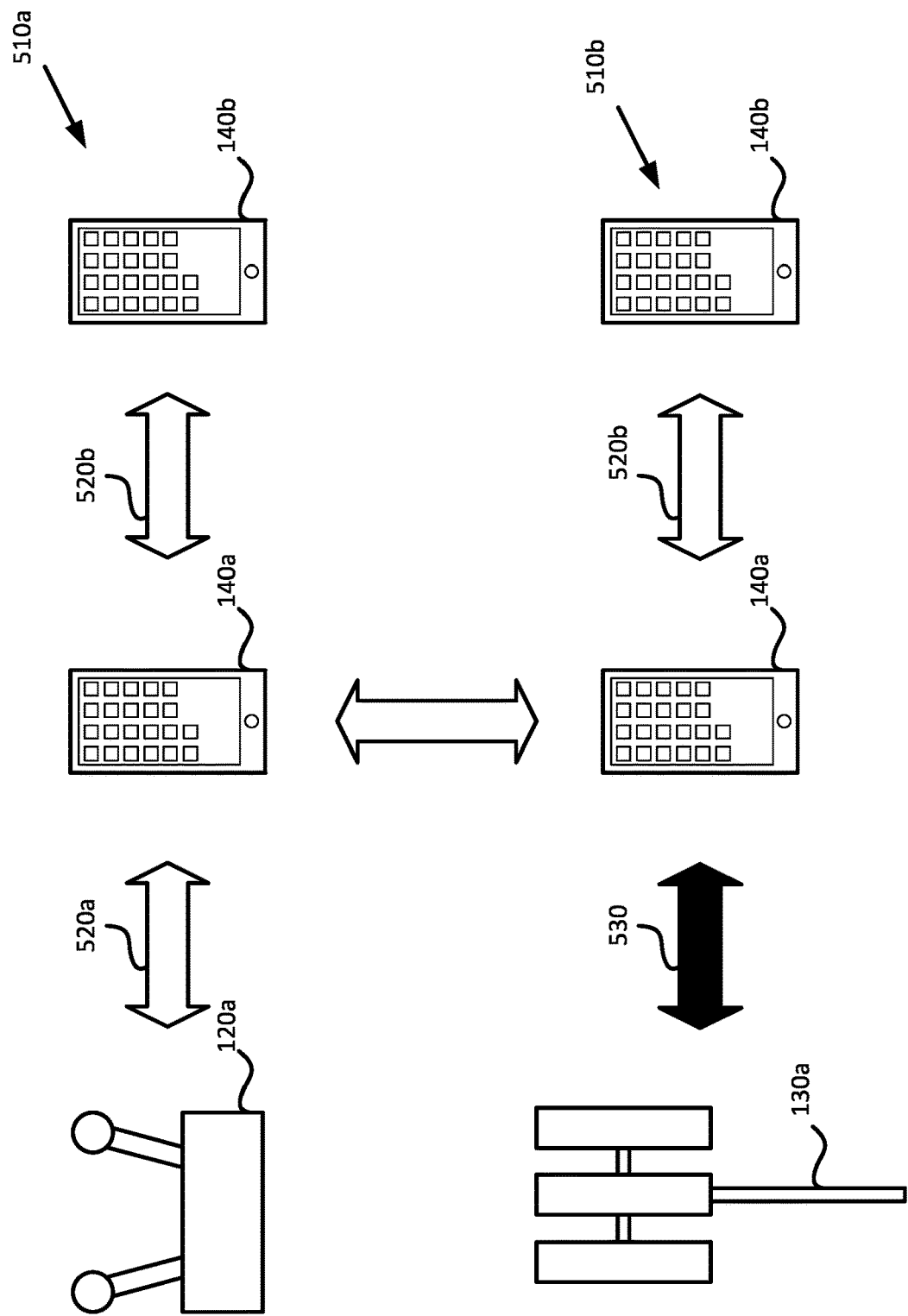
Figure 5C:
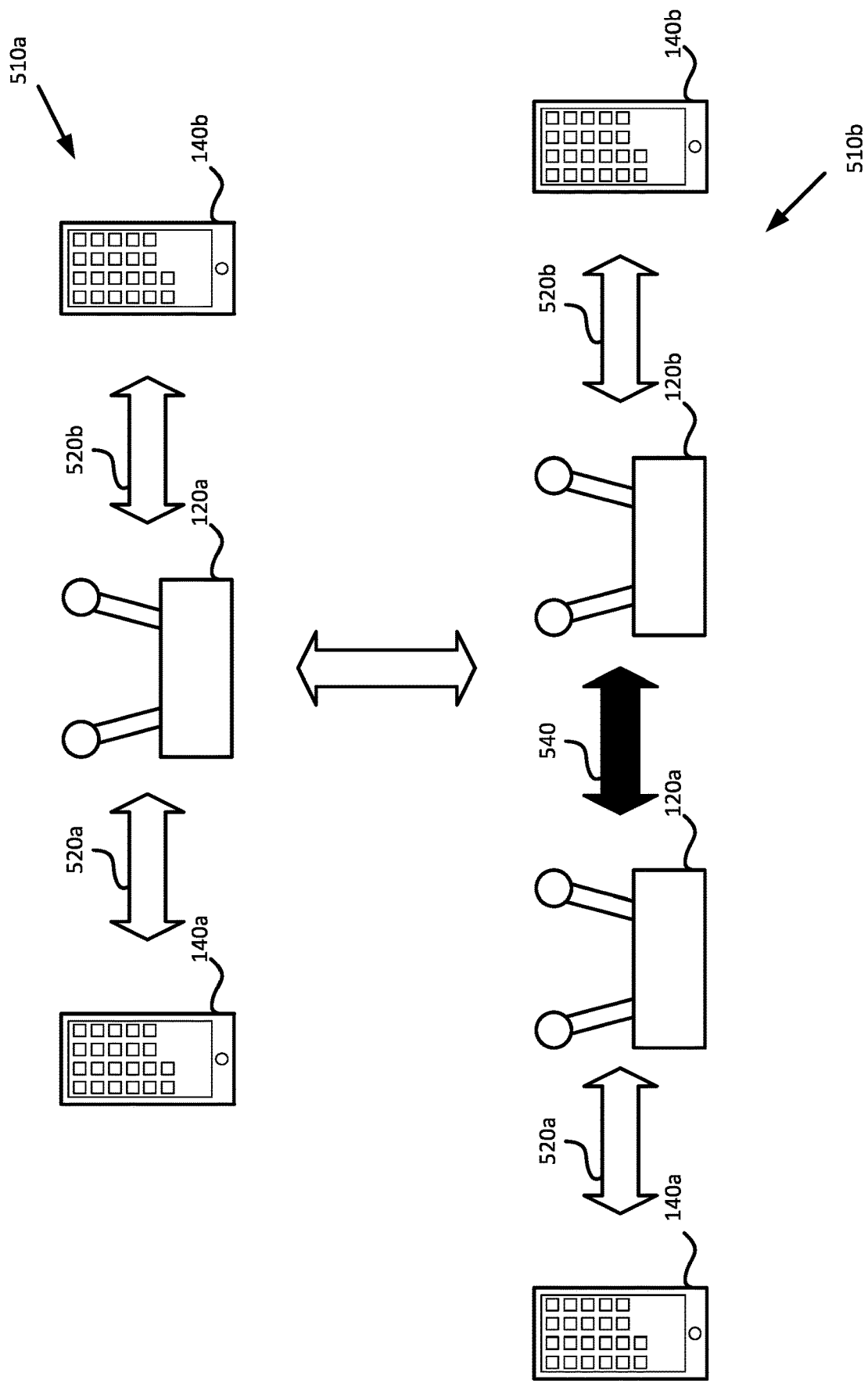

Although various individual changes to the assigned network are shown in FIGS. 4A-4D, the network controller 110 can combine several changes together (e.g., to add or remove multiple endpoints 140), including potential RAT changes as discussed in greater detail in regard to FIGS. 5A-5C. These changes may be made in parallel with one another or in series. Additionally, although the examples given in FIGS. 4A-4D are shown with certain number of devices, the network controller 110 can adjust the membership of a D2D communications session that initially or subsequently includes more or fewer devices than are illustrated in FIGS. 4A-4D.

In FIG. 4A, the network controller 110 has updated the initial set of network resources 410a to the subsequent set of network resources 410b by substituting a fourth endpoint 140d for the third endpoint 140c in the D2D communications session. In various embodiments, the network controller 110 may reroute the D2D communications session through the fourth endpoint 140d (from the third endpoint 140c) due to the third endpoint 140c dropping out of service otherwise becoming unavailable for routing D2D communications or movement of one or more of the first through fourth endpoints 140a-d in the network environment 100 that render the communications path through the fourth endpoint 140d more efficient or more resilient to interference than through the third endpoint 140c.

In FIG. 4B, the network controller 110 has updated the initial set of network resources 410a to the subsequent set of network resources 410b by adding a fourth endpoint 140d to route communications between the third endpoint 140c and the second endpoint 140b. In various embodiments, based on the distances between the individual devices participating, the network controller 110 can and or remove various devices from the D2D communications sessions to ensure communications are properly routed within a given allowable EIRP or to conserve sub-channels/PRBs. For example, the network controller 110 may add the fourth endpoint 140d in response to the second endpoint 140b moving out of range of the third endpoint 140c while the fourth endpoint 140d is within range of both the second endpoint 140b and the third endpoint 140c. In another example, the network controller 110 may add the fourth endpoint 140d in response to a need to lower the EIRP (and thus the effective ranges) of the second link 420b, even when the third endpoint 140c and the second endpoint 140b do not move in the environment 100.

In FIG. 4C, the network controller 110 has updated the initial set of network resources 410a to the subsequent set of network resources 410b by removing the third endpoint 140c from the D2D communications session so that communications are routed directly between the first endpoint 140a and the second endpoint 140b. In various embodiments, the third link 420c reuses the networking resources of one of the first link 420a or the second link 420b, while in other embodiments, the third link 420c uses different networking resources (e.g., a different sub-channel or PRB at the same or different EIRP) than the first link 420a or the second link 420b. In various embodiments, the network controller 110 removes the third endpoint 140c in response to the second endpoint 140b moving into range of the first endpoint 140a when the second endpoint 140b and first endpoint 140a were previously out of range of one another. In another example, the network controller 110 may remove the third endpoint 140c in response to the ability to assign as higher EIRP (and thus increase the effective ranges of the first and second endpoints 140a, 140b), even when the first endpoint 140a and the second endpoint 140b do not move in the environment 100.

In FIG. 4D, the network controller 110 has updated the initial set of network resources 410a to the subsequent set of network resources 410b by substituting a member AP 430 for the third endpoint 140c in the D2D communications session. In various embodiments, the member AP 430 may be an AP associated with one or more of the endpoints 140 engaged in the D2D communications session, or an AP that is unassociated with the member endpoints 140. Although routed similarly to non-D2D communications (i.e., through an AP between endpoints 140), the subsequent set of network resources 410b maintains the formatting and control of the communications as a D2D communications session. The updated communications session in handled the same as the original communications session, and various Key Performance Indicators are recorded and fed back to the network controller 110 to assess whether further updates are needed. While included in the D2D communications session, the network controller 110 treats the member AP 430 as an endpoint 140 for purposes of routing the individual communications for the D2D communications session, and accordingly, the member AP 430 may be assigned transmission times and channels by itself or another AP in the environment.

FIGS. 5A-5C illustrate potential RAT changes in a D2D communication session, according to embodiments of the present disclosure. Although various individual changes are shown in FIGS. 5A-5C, the network controller 110 can combine several changes together (e.g., to adjust several connection types), including potential membership changes as discussed in greater detail in regard to FIGS. 4A-4D. These changes may be made in parallel with one another or in series.

In each of FIGS. 5A-5C, an first set of network resources 510a of a D2D communications session includes a first endpoint 140a communicating to a second endpoint 140b, where the first endpoint 140a is associated with a first WLAN AP 120a that communicates how the D2D communications session is managed. In various embodiments, the second endpoint 140b may or may not be associated with the first WLAN AP 120a. A second set of network resources 510b shown in each of FIGS. 5A-5C, change at least one communications link in the D2D communications session from a first RAT type to a second communications type.

Although the examples given in FIGS. 5A-5C generally relate to the first RAT type (and associated APs) being used for WLAN communication and the second RAT type (and associated APs) being used for cellular communication, the designations of "first" and "second" for the network resources do not limit the disclosure from transitioning from WLAN to cellular RATs or from cellular to WLAN RATs. Stated differently, the communications between any two devices illustrated in FIGS. 5A-5C may be performed via any of the available RATs in the network environment 100, and the network controller 110 may transition any given link from one RAT to any other available RAT.

In FIG. 5A, the network controller 110 updates the RAT type for the communication link between a first endpoint 140a and a second endpoint 140b. In one example, the first endpoint 140a communicates with a first WLAN AP 120a via a first first-RAT link 520a (e.g., a WLAN link) and a second endpoint 140b via a second first-RAT link 520b. In this example, the D2D communications session is carried over the second first-RAT link 520b, while the first WLAN AP 120a sends management commands (e.g., indicating what network resources to use in the D2D communications session) over the first first-RAT link 520a.

One such management command can be to transition the D2D communications session to a different RAT type. For example, the D2D communications session can transition from the first RAT type to the second RAT type by updating the second first-RAT link 520b to a second-RAT link 530. Accordingly, the first endpoint 140a can remain associated with the first WLAN AP 120a and in communication therewith via the first first-RAT link 520a, but use the second RAT type to continue the D2D communications session with the second endpoint 140b.

In FIG. 5B, the network controller 110 updates the RAT type for the communication link between a first endpoint 140a and an AP. In one example, the first endpoint 140a communicates with a first WLAN AP 120a via a first first-RAT link 520a (e.g., a WLAN link) and a second endpoint 140b via a second first-RAT link 520b. In this example, the D2D communications session is carried over the second first-RAT link 520b, while a first WLAN AP 120a sends management commands (e.g., indicating what network resources to use in the D2D communications session) over the first first-RAT link 520a.

The link between two endpoints 140 (or an endpoint 140 and an AP acting as an endpoint) can change RAT types in response to the endpoint 140 selecting a new RAT type to use, the endpoint 140 selecting to no longer use an initial RAT type for D2D communications, the network controller 110 identifying that the network resources used in the link between the endpoints 140 are to be reassigned, or the like.

One such management command can be to change which AP the first endpoint 140a is associated with. For example, the first endpoint 140a may request (or be instructed) to handover association from a first AP to a second AP of a different RAT type. Accordingly, the link between the first endpoint 140a and an associated AP that will continue managing the D2D and other communications can transition from the first RAT type to the second RAT type by updating the first first-RAT link 520a to a second-RAT link 530. Accordingly, the first endpoint 140a can continue communicating via a D2D communications session over the second first-RAT link 520b with the second endpoint 140b, but re-associate with the first cellular AP 130a via the second-RAT link 530.

The link between an AP and an endpoint 140 can change RAT types in response to the endpoint 140 selecting a new RAT type to use, the endpoint losing connection to an initial AP, the endpoint 140 gaining a better (potential) connection to the new AP, the network controller 110 identifying that the network resources used in the link between the initial AP and the endpoint 140 are to be reassigned, or the like.

In FIG. 5C, the network controller 110 inserts a bridge link 540 in a D2D communications session that initially traverses a first WLAN AP 120a (acting as an endpoint) between a first endpoint 140a and a second endpoint 140b. In the first set of network resources 510a, a first first-RAT link 520a and a second first-RAT link 520b connect the first WLAN 120a to the first endpoint 140a and the second endpoint 140b, respectively. In the second set of network resources, the first endpoint 140a uses the first first-RAT link 520a to communicate with the first WLAN AP 120a, and the second endpoint 140b uses the second first-RAT link 520b to communicate with a second WLAN AP 120b that is in communication with the first WLAN AP 120a via a bridge link 540.

In various embodiments, the bridge link 540 can use the same RAT type as the links between the APs and the respective endpoints 140, a wired link, or a different RAT type from the links with the APs and the respective endpoints 140. Although illustrated in FIG. 5C as a first WLAN AP 120a and a second WLAN AP 120b, in various embodiments, the bridge link 540 can also connect two cellular APs 130 or one WLAN AP 120 with one cellular AP 130. Accordingly, a pair of APs can operate as a coordinated element to link two endpoints 140 in a D2D communications session when the network controller 110 establishes a bridge link 540 between those APs.

Figure 6:
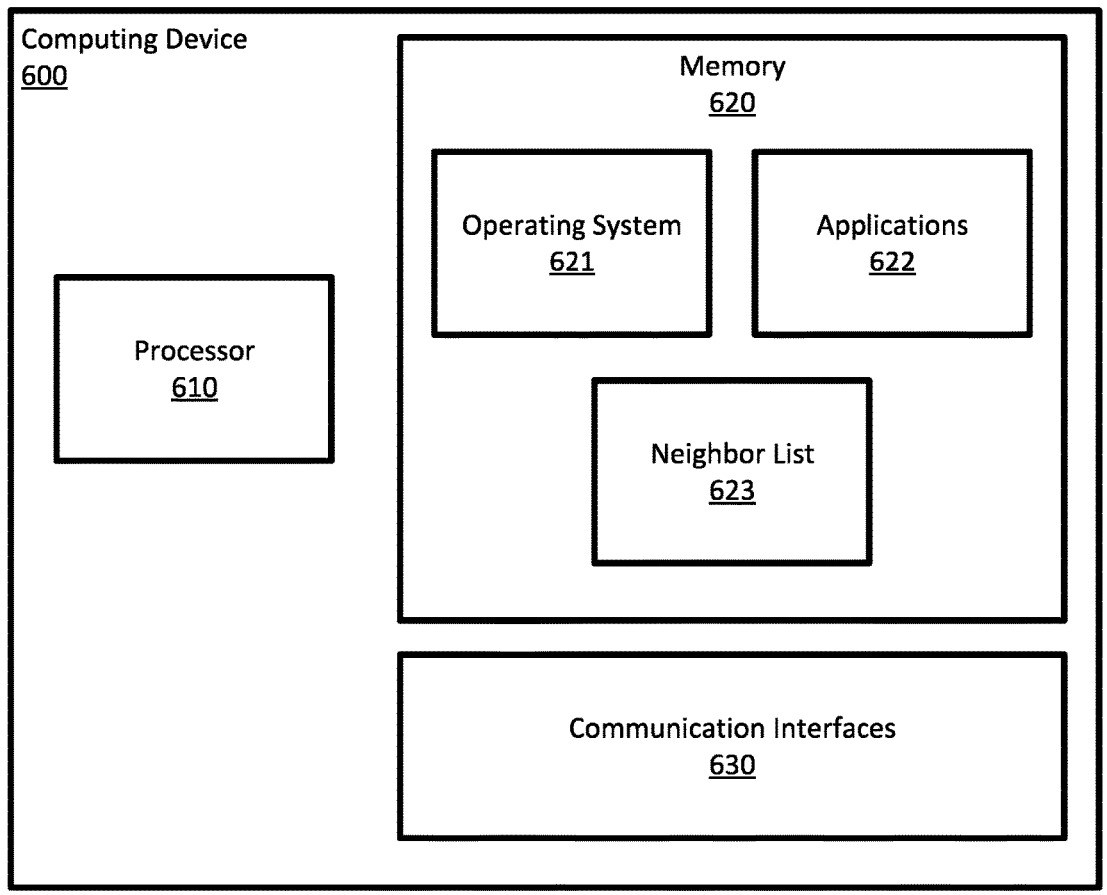
FIG. 6 illustrates hardware of a computing device, according to embodiments of the present disclosure.

FIG. 6 illustrates hardware of a computing device 600, as may be used in an AP or an endpoint 140 described in the present disclosure. The computing device 600 includes a processor 610, a memory 620, and communication interfaces 630. The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communications interfaces 630 are representative connectors and controllers for wireless communications antennas and various wired communication ports. In various embodiments the communications interfaces 630 may connect to and control several different antennas configured to transmit and receive signals at various wavelengths in various communications bands and RATs.

The memory 620 may be either volatile or non-volatile memory and may include RAM, flash, cache, disk drives, and other computer readable memory storage devices. As used herein, the term "computer readable storage device" shall be understood to refer to the physical apparatuses used to store instructions or data, and not refer to signals. Although shown as a single entity, the memory 620 may be divided into different memory storage elements such as RAM and one or more hard disk drives. As shown, the memory 620 includes various instructions that are executable by the processor 610 to provide an operating system 621 to manage various functions of the computing device 600 and one or more applications 622 to provide various functionalities to users of the computing device 600, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system for managing a heterogeneous wireless network environment that offers communications via a first Radio Access Technology (RAT) and a second, different RAT, the system comprising:
   a processor; and
   a memory including instructions that when executed by the processor enable performance of operations comprising:
      identifying, at a network controller for the heterogeneous wireless network environment, a first dual-mode endpoint seeking to communicate with a second dual-mode endpoint via a device-to-device (D2D) communications session;
      identifying a first communications pattern of network resource usage based on non-D2D communications in the first RAT, current D2D communications in the first RAT, and assigning the D2D communications session to the first RAT and a second communications pattern of network resource usage based on non-D2D communications in the second RAT, current D2D communications in the second RAT, and assigning the D2D communications session to the second RAT in the heterogeneous wireless network environment;
      assigning the D2D communications session to the first RAT based on the first communication pattern and the second communication pattern; and
      in response to detecting network resource usage changes in the first RAT, transitioning the D2D communications session to the second RAT.

2. The system of claim 1, wherein the D2D communications session is assigned to the first RAT using a shared frequency regulated by a band access controller, wherein the shared frequency is reserved by the band access controller as a static resource for D2D communication while high-priority signals are absent from the shared frequency.

3. The system of claim 2, wherein the D2D communications session is assigned to the first RAT using a first shared frequency regulated by a first band access controller in response to determining that static resources reserved for D2D communication in a second shared frequency by a second band access controller are insufficient for handling the D2D communications session; and
   wherein the first band access controller identifies network resources sufficient for handling the D2D communications session from a dynamic set of sub-channels and Physical Resource Blocks available in the first shared frequency.

4. The system of claim 1, where the operations further comprise:
   assigning a third dual-mode endpoint as an intermediate device in the D2D communications session based on a first location of the first dual-mode endpoint, a second location of the second dual-mode endpoint, and a third location of the third dual-mode endpoint.

5. The system of claim 4, wherein transitioning the D2D communications session to the second RAT transitions a first link between the first dual-mode endpoint and the third dual-mode endpoint from the first RAT to the second RAT while a second link between the third dual-mode endpoint and the second dual-mode endpoint remains assigned to the first RAT.

6. The system of claim 1, wherein the first communications pattern for the first RAT and the second communications pattern for the second RAT include:
   a network topology for the wireless network environment;
   coverage ranges of individual Access Points (APs) in the wireless network environment;
   Effective Isotropic Radiative Powers permitted for signals in the wireless network environment; and
   bandwidth for each of the individual APs.

7. The system of claim 1, wherein identifying the first dual-mode endpoint seeking to communicate with the second dual-mode endpoint via the D2D communications session further comprises:
receiving a request to initiate the D2D communications session from the first dual-mode endpoint.

8. A system for managing a heterogeneous wireless network environment that offers communications via a first Radio Access Technology (RAT) and a second RAT, the system comprising:
a processor; and
a memory including instructions that when executed by the processor enable performance of operations comprising:
identifying, at a network controller for the heterogeneous wireless network environment, a device-to-device (D2D) communications session between a first dual-mode endpoint and a second dual-mode endpoint using a first set of network resources;
identifying communications patterns of network resource usage of D2D communications for the first RAT and the second RAT, and non-D2D communications for the first RAT and the second RAT in the heterogeneous wireless network environment; and
in response to detecting changes in the communications patterns, substituting a second set of network resources for the first set of network resources.

9. The system of claim 8, wherein the D2D communications session is assigned to the first RAT in the first set of network resources based on the communication patterns and the second set of network resources transitions the D2D communications session to the second RAT in response to detecting network resource usage changes in the first RAT.

10. The system of claim 8, wherein the first set of network resources includes a first sub-channel or physical resource block for use with the first RAT and the second set of network resources includes a second sub-channel or physical resource block for use with the first RAT to replace the first sub-channel or physical resource block.

11. The system of claim 8, wherein the first dual-mode endpoint is associated with an Access Point (AP) according to the first RAT and the D2D communications session is managed according to the second RAT.

12. The system of claim 8, wherein first set of network resources includes a first link between the first dual-mode endpoint and a first intermediate device, and a second link between the first intermediate device and the second dual-mode endpoint, wherein substituting the second set of network resources for the first set of network resources includes at least one of:
substituting a second intermediate device for the first intermediate device;
removing the first link, the second link, and first intermediate device and adding a third link between the first dual-mode endpoint and the second dual-mode endpoint; and
removing the second link and adding a third intermediate device, a third link between the first intermediate device and the third intermediate device, and a fourth link between the third intermediate device and the second dual-mode endpoint.

13. The system of claim 8, wherein identifying the communication patterns includes analyzing network topology, including locations of the first dual-mode endpoint and the second dual-mode endpoint and Access Points (APs) in the heterogeneous wireless network environment to identify coverage areas and channels used by the APs.

\* \* \* \* \*